Patented Jan. 21, 1930

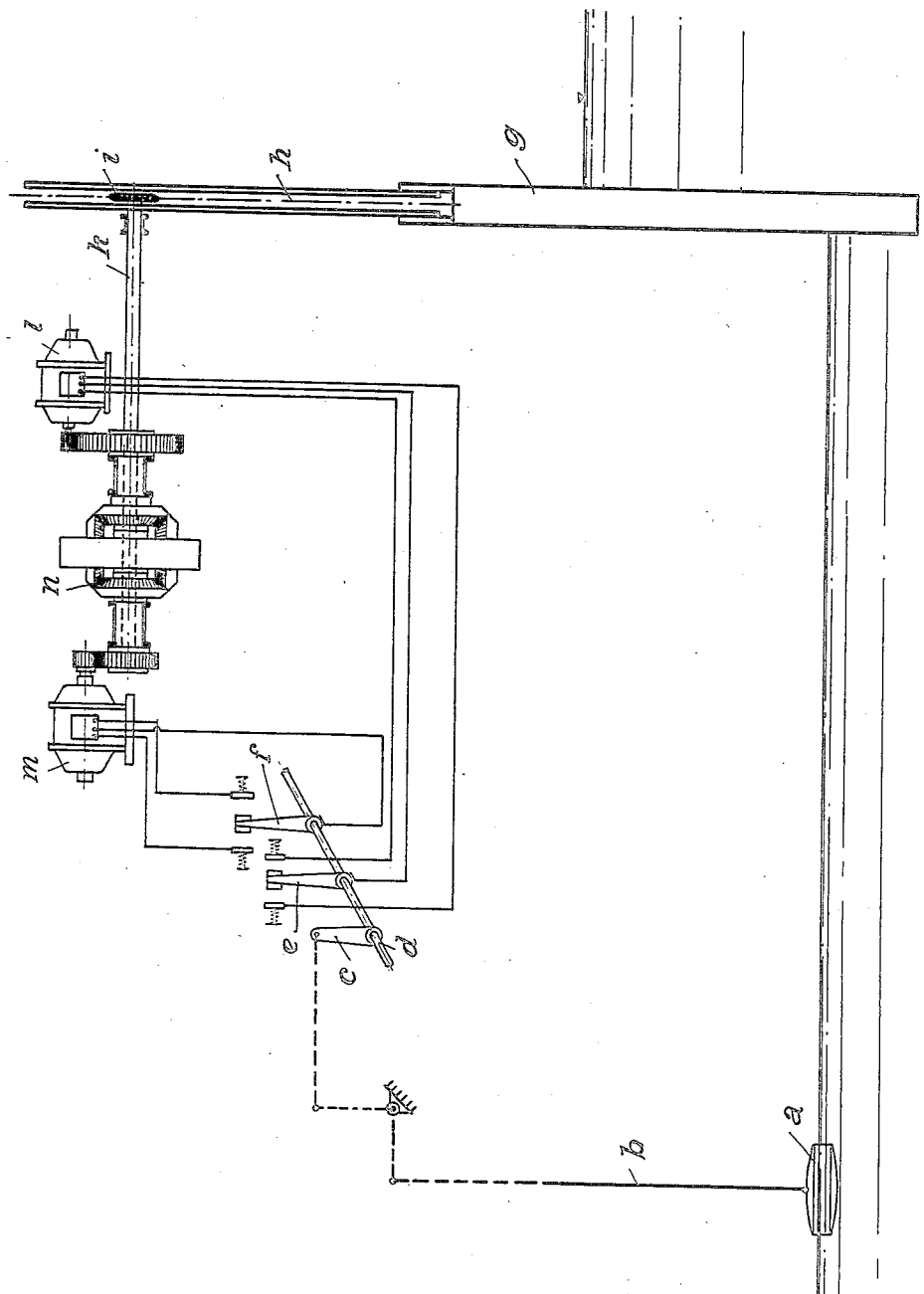

1,744,455

UNITED STATES PATENT OFFICE

FRIEDRICH DUWE, OF MAINZ, GERMANY, ASSIGNOR TO MASCHINENFABRIK AUGS-BURG-NURNBERG, A. G., OF NUREMBERG, GERMANY, A CORPORATION OF GERMANY

REGULATING DEVICE FOR GATES OF WEIRS

Application filed January 25, 1928, Serial No. 249,323, and in Germany March 30, 1927.

It is known to provide automatically acting regulating devices for the purpose of maintaining water-levels at a constant height, said regulating devices comprising for instance a float provided on the water-level to be kept constant and electrical contacts which control the operation of a sluice or gate of a weir which is operated by an electric motor. These devices work satisfactorily if the fluctuations of the water-level are relatively small or if the requirements as regards accuracy of regulation are not very high. However such devices are liable to fail if the existing conditions, for instance, require a more accurate regulation.

The object of this invention is to design a regulating device capable of complying with very high requirements.

The invention consists essentially in this that for the raising or lowering of the gate, instead of the single motor which is generally used for this purpose, there are provided two or more motors which may be successively connected with the circuit in order to raise the gate at different velocities or which act upon gates having passages of different width. According to this invention there are furthermore provided for each motor special switching instrumentalities which may be actuated in succession by a float in dependence on the fluctuations of the water-level to be regulated. The mode of operation of a gate constructed according to my invention may for instance be such that in case of small fluctuations of the water-lever first only one motor is switched into circuit. If, however, the water-level rises beyond a certain height, the second motor will also be switched into circuit, which together with the first motor will give the gate a greater velocity, thus permitting a more effective regulation to be employed. If it is desired to operate two gates having passages of different width, for instance, first the smaller gate is used for regulating purposes and in case of greater fluctuations of the water-level the greater gate is operated by the aid of said second motor.

The accompanying drawing represents diagrammatically a general view of a regulating device embodying this invention, said regulating device including two motors which commonly operate upon the gate of a weir.

If it is assumed that the tail-water be regulated to maintain its level at a constant height, the float $a$ will transmit its motion by means of a link or similar mechanism $b$ upon the regulating lever $c$ which forms part of the regulating device and the regulating shaft $d$ upon which the two contact arms $e$ and $f$ are mounted. The link mechanism $b$ is only indicated diagrammatically. In actual practice the known back-guiding device is inserted into the link mechanism $b$ as well as further auxiliaries whereby a greater accuracy of regulation is obtained.

The gate $g$ is operated by means of the rack $h$ and the pinion $i$ engaging therewith from the main driving shaft $k$. Two electric motors $l$ and $m$ are provided to operate said driving shaft $k$; more particularly, a differential bevel gear $n$ is provided intermediate said motors and said main driving shaft $k$, as indicated in the drawing.

The motor $l$ is controlled by the contact arm $e$ and operates the gate $g$ in case of small fluctuations of the water-level. The contacts which are provided on the arm $e$ will therefore operate if the shaft $d$ is rotated only to a small extent, as may be seen from the drawing. In case the regulation performed by the motor $l$ is not sufficient and if in consequence thereof the degree of rotation of the shaft $d$ caused by the float, increases, the second contact arm $f$ controlling the motor $m$ will come into operation. This motor being now also switched into circuit will impart a greater velocity to the gate $g$ by the aid of the differential gear $n$ and the simultaneously operating motor $l$.

The mode of operation of the differential gear is well known in the art and further explanation is therefore not necessary. If required a third motor may be employed with the result of still further increasing the velocity of regulation. For this purpose, evidently a further contact arm would have to be provided upon the regulating shaft $d$, in order to properly control said third motor.

If a regulation is desired for gates having passages of different width, the two motors *l* and *m* which are shown in the drawing, instead of operating upon a common shaft would each separately operate one of said gates. Evidently, also in this case two motors may be provided for each gate, which motors, similarly to the construction shown in the drawing, would be successively switched into circuit.

Instead of the float as shown in the drawing for bringing about the regulation, also other devices may be used serving the same purpose.

I claim:

1. In combination with a gate of a weir, or the like, a plurality of normally inactive motors adapted to produce different velocities of the gate, means separately associated with said motors for successively operating the same thereby producing first a smaller and then a greater velocity of the gate, and means controlled by the water level to be regulated to actuate said first-named means.

2. In combination with a gate of a weir, or the like, a normally inactive electric motor adapted to operate the gate at low velocity, a second normally inactive electric motor adapted to operate the gate at a greater velocity, an electric circuit, and electric means in said circuit controlled by the water level to be regulated so as to operate said first motor at small water-level flunctuations and thereupon said second motor at greater water level fluctuations.

3. In combination with a gate of a weir, or the like, a pair of normally inactive motors, a differential gear operatively connected with said motors, a main shaft leading from said differential gear to said gate, an electric circuit, and electric means in said circuit adapted to control each of said motors in dependence of the water level to be regulated, said electric means being adapted to operate only one of said motors during small water level fluctuations and both motors during greater water level fluctuations.

In testimony whereof I affix my signature.

FRIEDRICH DUWE.